United States Patent
Kauffman et al.

(10) Patent No.: US 9,643,171 B2
(45) Date of Patent: May 9, 2017

(54) METHOD OF MAKING HETEROPOLY ACID COMPOUND CATALYSTS

(75) Inventors: James W. Kauffman, Katy, TX (US); Wugeng Liang, Elgin, IL (US); Lixia Cai, Maple Glen, PA (US); Joseph Linzer, Issaquah, WA (US)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 1104 days.

(21) Appl. No.: 12/712,481

(22) Filed: Feb. 25, 2010
(Under 37 CFR 1.47)

(65) Prior Publication Data
US 2011/0207600 A1    Aug. 25, 2011

(51) Int. Cl.
| | |
|---|---|
| *B01J 37/02* | (2006.01) |
| *B01J 23/00* | (2006.01) |
| *B01J 23/887* | (2006.01) |
| *B01J 27/199* | (2006.01) |
| *B01J 35/02* | (2006.01) |

(Continued)

(52) U.S. Cl.
CPC ......... *B01J 37/0248* (2013.01); *B01J 23/002* (2013.01); *B01J 23/8877* (2013.01); *B01J 27/199* (2013.01); *B01J 35/026* (2013.01); *B01J 37/038* (2013.01); *B01J 37/12* (2013.01); *B01J 2523/00* (2013.01)

(58) Field of Classification Search
USPC ................ 502/202, 205, 208, 209, 212, 158
See application file for complete search history.

(56) References Cited

U.S. PATENT DOCUMENTS

| | | |
|---|---|---|
| 5,714,429 A | 2/1998 | Haining |
| 6,432,870 B1 | 8/2002 | Tu et al. |

(Continued)

FOREIGN PATENT DOCUMENTS

| | | |
|---|---|---|
| JP | 2007105716 A | 4/2007 |
| JP | 2008307450 A | 12/2008 |

OTHER PUBLICATIONS

International Search Report; International Application No. PCT/US2011/024752; International Filing Date: Feb. 14, 2011; Date of Mailing: Apr. 19, 2011; 2 Pages.

(Continued)

*Primary Examiner* — Melvin C Mayes
*Assistant Examiner* — Colette Nguyen
(74) *Attorney, Agent, or Firm* — Cantor Colburn LLP

(57) ABSTRACT

The invention is for a method for making a heteropoly acid compound catalyst from compounds containing molybdenum, vanadium, phosphorus, cesium, copper, bismuth, antimony and boron in which molybdenum, vanadium, phosphorus, cesium, copper, bismuth and boron are at their highest oxidation states and antimony has a 3+ oxidation state. The catalyst contains oxides of molybdenum, vanadium, phosphorus, cesium, copper, bismuth, antimony, boron and, optionally, other metals. The catalyst has the formula:

$$Mo_{12}V_aP_bCs_cCu_dBi_eSb_fB_gO_x$$

where Mo is molybdenum, V is vanadium, P is phosphorus, Cs is cesium, Cu is copper, Bi is bismuth, Sb is antimony, B is boron, O is oxygen, a is 0.01 to 5.0, b is 0.5 to 3.5, c is 0.01 to 2.0, d is 0.0-1.5, e is 0.0-2.0, f is 0.01-3.0, g is 0.0-4.0 and x satisfies the valences. Molybdenum is reduced by antimony and reoxidized during catalyst synthesis.

32 Claims, 1 Drawing Sheet

(51) Int. Cl.
*B01J 37/03* (2006.01)
*B01J 37/12* (2006.01)

(56) References Cited

U.S. PATENT DOCUMENTS

| | | | |
|---|---|---|---|
| 6,914,029 B2* | 7/2005 | Davis et al. | 502/150 |
| 7,304,014 B2 | 12/2007 | Cavalcanti et al. | |
| 7,485,596 B2* | 2/2009 | Kauffman et al. | 502/212 |
| 7,732,367 B2* | 6/2010 | Stevenson et al. | 502/208 |
| 2007/0021296 A1 | 1/2007 | Liang et al. | |
| 2007/0106091 A1 | 5/2007 | Stevenson et al. | |
| 2010/0010238 A1 | 1/2010 | Eger et al. | |
| 2010/0184591 A1* | 7/2010 | Noh et al. | 502/209 |

OTHER PUBLICATIONS

Written Opinion of the International Searching Authority; International Application No. PCT/US2011/024752;International Filing Date: Feb. 14, 2011; Date of Mailing: Apr. 19, 2011; 5 Pages.

JP 05-329371 A English Abstract; Date of Publication Dec. 14, 1993; 1 page.

JP 11-343261 A English Abstract; Date of Publication Dec. 14, 1999; 1 page.

JP 11-343262 A English Abstract; Date of Publication Dec. 14, 1999; 1 page.

JP2000070714 A English Abstract; Date of Publication Mar. 7, 2000; 2 pages.

JP2001500427 A English Abstract; Date of Publication Jan. 16, 2001; 1 page.

JP2005161309 A English Abstract; Date of Publication Jun. 23, 2005; 2 pages.

JP2005205401 A English Abstract; Date of Publication Aug. 4, 2005; 1 page.

European Search Report for European Application No. 11747864.4; Date of Completion: Jul. 28, 2014; Date of Mailing: Aug. 8, 2014; 7 pages.

Al-Saeedi et al.; "Bulk structure and catalytic properties of mixed Mo—V—Sb—Nb oxides for selective propane oxidation to acrylic acid"; Journal of Catalysis 215; 2003; pp. 108-115.

Encyclopedia of Chemical Processing, vol. 2; Chen Guanrong; p. 785; Chemical Industry Press; English Translation Only; Dec. 31, 1991.

Cavani et al.; "Effect of Antimony on the Chemical-Physical Features and Reactivity in Isobutyric Acid Oxidehydrogenation of Keggin-Type Heteropolycompounds"; Jourrnal of Catalysis 174; pp. 231-241; 1998; Article No. CA981983.

\* cited by examiner

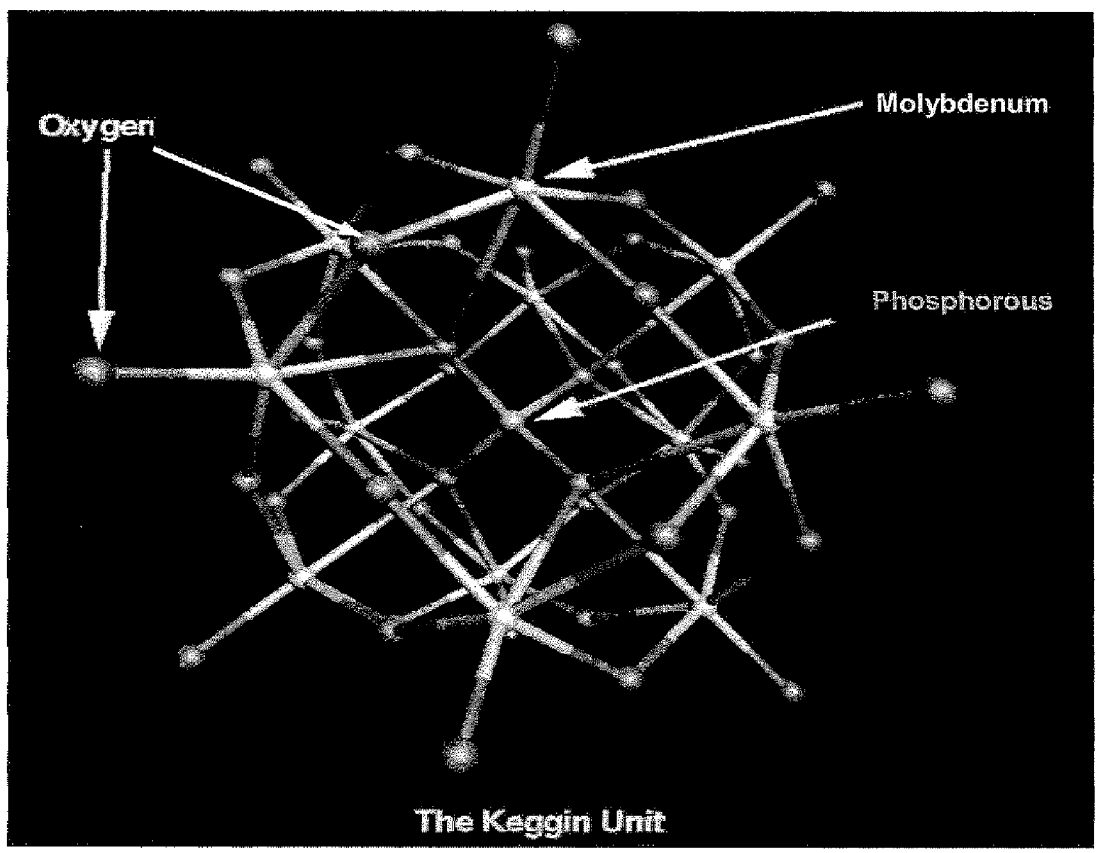

METHOD OF MAKING HETEROPOLY ACID COMPOUND CATALYSTS

BACKGROUND OF THE INVENTION

Field of the Invention

This invention relates to a method of making heteropoly acid compound catalysts containing oxides of molybdenum, vanadium, phosphorus, bismuth, copper, antimony, boron, cesium and, optionally, other metals. The catalyst may be used in a process for the oxidation of unsaturated aldehydes, such as methacrolein, to unsaturated carboxylic acids, such as methacrylic acid, in a vapor phase reaction.

Description of the Prior Art

Heteropoly acid compounds are metal oxide clusters forming heteropolyoxoanions in acid form and can include oxides of molybdenum, phosphorus, arsenic, cesium, rubidium, cobalt, nickel, iron, chromium, antimony, tellurium and silicon. Heteropoly acid compounds have a central metal atom surrounded by a framework of other metal atoms connected to each other and the central metal atom through oxygen atoms. The central metal atom is different ("hetero") from the framework metal atoms. Heteropoly acid compounds are known as catalysts. The oxidation state of certain components has been shown to affect catalyst performance.

U.S. Pat. No. 6,914,029 discloses a selective hydrocarbon partial oxidation catalyst to partially oxidize $C_3$ and $C_4$ hydrocarbon selectively to acrylic acid and maleic acid. The catalyst is a partially reduced polyoxometallate, such as niobium polyoxomolybdate, prepared from a polyoxoanion which has been exchanged with a cation and activated by heating in the presence of a reducing agent, such as pyridinium. The cation should not be in its lowest oxidation state since it should be capable of partial reduction during activation. Changes in the oxidation state of the molybdenum were observed during activation and under reaction conditions.

U.S. Pat. No. 5,714,429 discloses a heteropolyacid catalyst supported on silica in the form of extrudates or pellets useful in a process for the hydration of olefins to corresponding alcohols. Polyvalent oxidation states of the heteropolyacids may change during the impregnation of the heteropolyacid onto the support and/or under process conditions.

Prior art discloses catalysts which contain molybdenum, vanadium, phosphorus, cesium, copper, bismuth, antimony, boron and other metals for the production of methacrolein. In the present invention, the oxidation state of certain components, specifically molybdenum and antimony, and the change of oxidation state of certain components during the process of making the catalyst are shown to affect the activity and stability of these catalysts for the oxidation of methacrolein to methacrylic acid.

SUMMARY OF THE INVENTION

The present invention is for a method of making a heteropoly acid compound catalyst composition. The catalyst may be used in a process for the oxidation of unsaturated aldehydes, such as methacrolein, to unsaturated carboxylic acids, such as methacrylic acid, in a vapor phase reaction. The catalyst composition is of the general formula:

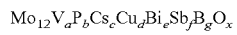

where Mo is molybdenum, V is vanadium, P is phosphorus, Cs is cesium, Cu is copper, Bi is bismuth, Sb is antimony, B is boron, O is oxygen, a is 0.01 to 5.0, b is 0.5 to 3.5, c is 0.01 to 2.0, d is 0.0-1.5, e is 0.0-2.0, f is 0.01-3.01, g is 0.0-4.0 and x satisfies the valences. Other elements, such as lithium, sodium, potassium, magnesium, calcium, strontium, barium, rubidium, zirconium, titanium, chromium, manganese, cobalt, nickel, zinc, cadmium, aluminum, gallium, indium, thallium, silicon, germanium, tin, lead, sulfur, selenium and/or tellurium may be present.

In general, the method of making the catalyst is to dissolve compounds of the catalyst components of the heteropoly acid compound in an acidified aqueous solution, precipitating particles of the catalyst precursor, drying the solid particles and calcining the solid particles. The component compounds may be added as dissolved solutions, solids or aqueous slurries. All of the component compounds are in their highest oxidation state except antimony (3+ v. 5+). During catalyst synthesis antimony will reduce molybdenum to a lower oxidation state. One embodiment of the present invention is to minimize reduction of molybdenum to a lower oxidation state. Another embodiment of the present invention is to reoxidize the molybdenum to a higher oxidation state after it has been reduced.

In general, the process of using the catalyst compositions for the oxidation of unsaturated aldehydes to unsaturated carboxylic acids in a vapor phase reaction is to contact the unsaturated aldehyde, such as methacrolein, with an oxygen-containing gas, such as air, in the presence of the heteropoly acid compound catalyst at conditions to produce an unsaturated carboxylic acid, such as methacrylic acid.

BRIEF DESCRIPTION OF THE DRAWINGS

A more complete appreciation of the invention and many of the attendant advantages thereof will be readily understood by reference to the following detailed description when considered in connection with the accompanying drawings:

FIGURE is an illustration of the structure of a heteropoly acid compound (Keggin unit)

DESCRIPTION OF EMBODIMENTS OF THE INVENTION

The catalyst is a heteropoly acid compound catalyst of the formula:

where Mo is molybdenum, V is vanadium, P is phosphorus, Cs is cesium, Cu is copper, Bi is bismuth, Sb is antimony, B is boron, O is oxygen, a is 0.01 to 5.0, b is 0.5 to 3.5, c is 0.01 to 2.0, d is 0.0-1.5, e is 0.0-2.0, f is 0.01-3.01, g is 0.0-4.0 and x satisfies the valences.

In another embodiment of the invention the catalyst is of the formula:

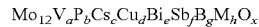

wherein M is lithium, sodium, potassium, magnesium, calcium, strontium, barium, rubidium, zirconium, titanium, chromium, manganese, cobalt, nickel, zinc, cadmium, aluminum, gallium, indium, thallium, silicon, germanium, tin, lead, sulfur, selenium or tellurium and h is in the range from 0 to 9.

The process of making the catalyst is generally to dissolve the metal compounds in water or in an acid, precipitate a solid catalyst precursor to form a slurry, separate the solid by removing liquid from the slurry to leave a solid, dry the solid, form the solid and calcine the solid to form a catalyst. The metal compounds may be salts (e.g., nitrates, halides, ammonium, organic acid, and inorganic acid), oxides, hydroxides, carbonates, oxyhalides, sulfates and other groups which may exchange with oxygen under high temperatures so that the metal compounds become metal oxides.

Suitable molybdenum compounds are, but not limited to, ammonium molybdate, ammonium paramolybdate, molybdenum trioxide, molybdenum chloride or mixtures or combinations thereof.

Suitable phosphorous compounds are, but not limited to, phosphoric acid, ammonium phosphate or mixtures or combinations thereof.

Suitable copper compounds are, but not limited to, copper nitrate, copper chloride or mixtures or combinations thereof.

Suitable bismuth compounds are, but not limited to, bismuth nitrate, bismuth oxide, bismuth chloride or mixtures or combinations thereof.

Suitable vanadium compounds are, but not limited to, ammonium vanadate, ammonium metavanadate, vanadium pentoxide, vanadium chloride or mixtures or combinations thereof.

Suitable boron compounds are, but not limited to, boric acid, boric hydroxide and boron oxide.

Suitable antimony compounds are, but not limited to, antimony oxide or antimony trioxide Suitable cesium compounds are, but not limited to, cesium nitrate, cesium oxide, cesium hydroxides or a salt of cesium.

In one embodiment of the invention, the metal compounds are soluble in water or an acid. In another embodiment of the invention the molybdenum compound is an ammonium salt, such as ammonium paramolybdate or ammonium molybdate, the vanadium compound is an ammonium salt such as ammonium metavanadate or ammonium vanadate, the phosphorus compound is phosphoric acid, the bismuth, cobalt, nickel, cesium, magnesium, zinc, potassium, rubidium, thallium, manganese, barium, chromium, boron, sulfur, silicon, aluminum, titanium, tellurium, tin, vanadium, zirconium, lead, cadmium, copper, gallium, indium and germanium compounds are nitrates, oxides, hydroxides or acids, the antimony compound is an oxide, such as antimony oxide or antimony trioxide, the calcium, strontium, lithium and sodium compounds are nitrates or carbonates and the selenium compound is an oxide. In one embodiment of the invention, the bismuth, cesium, cobalt, nickel, magnesium and zinc compounds are nitrates.

The present invention does not depend on a particular order of addition of the components. While a particular order of addition of the various metal compound components may affect the performance of the catalyst, the present invention is directed toward the particular oxidation state of certain components without regard to the order in which the steps in the process of making the catalyst occur.

An example of making the catalyst of the claimed invention is to dissolve the ammonium salt of molybdenum, such as ammonium paramolybdate or ammonium molybdate, ammonium metavanadate and phosphoric acid in water. Cesium nitrate dissolved in water is added to the mixture to form a precipitate and slurry. Bismuth nitrate dissolved in an acid or as a solid is added to the solution mixture. Copper nitrate is dissolved in water and added to the slurry at room temperature in a range of 20-40° C. The solution mixture temperature is raised to about 80-100° C. and antimony oxide and boric acid are added as solids. The slurry may be aged or digested from about 10 minutes to 20 hours. The solid is separated from the liquid of the slurry. The liquid of the slurry is removed and the solid precipitate dried, formed and calcined to obtain a catalyst. The liquid may be removed and the solid precipitate dried at the same time by spray drying or the liquid may be evaporated. Evaporation may be at a temperature of 50-175° C. followed by drying, forming and calcining of the precipitate.

Drying of the catalyst precursor may be in air or a mixture of air with an inert gas and in an oven or a spray dryer. In one embodiment of the invention, drying is in an oven in air at a temperature of 100-150° C. for 2-5 hours.

The catalyst precursor may be calcined at a temperature of 200-400° C. for 1-12 hours. Calcination may be in two stages. The calcinations stages may be consecutive or may be separated by one or more process steps. For example, one stage may be before forming and the second stage may be after forming. The first stage may be at a temperature of 150-300° C. for 1-5 hours and the second stage at a temperature of 300-400° C. for 4-8 hours. The temperature may be increased with a temperature ramp of 1-20° C./min, or of 5-10° C./min. In one embodiment of the invention for a two-stage calcination, the first is at a temperature of 210-310° C. for 5 hours and second at a temperature of 300-400° C. for 2 hours. Denitrification may occur in the first step. In the alternative, calcination is in one stage by increasing the temperature from ambient temperature to about 400° C. over two hours instead of an initial step or denitrification. Calcination may be done in a high temperature oven or kiln. Calcination may be in air or enriched air (greater than 21% molecular oxygen by volume).

One theory, without limiting the scope of the claims of the present invention, is that catalyst activity and performance after the final calcination depends on how effectively the molybdenum in the keggin catalyst is fully oxidized during each stage of manufacture including wet synthesis, drying, forming, calcination and storage. If oxidation is not complete in one stage, it can not be compensated for in a later stage, so the final activity of the catalyst depends on the effectiveness of oxidation during each of the synthesis, drying, and calcination stages. Each stage requires specific procedural techniques for ensuring good oxidation. Furthermore, the extent to which molybdenum has to be reoxidized is determined by the extent of molybdenum reduction which depends on how much antimony (3+) has reacted with the molybdenum to reduce it to oxidation state of less than (+6), e.g., (4+, 5+). This interdependence between molybdenum reduction by antimony and oxidation by oxygen must be balanced to obtain maximum oxidation of the catalyst and is defined by specific manufacturing techniques.

Antimony should have a 3+ oxidation state. During catalyst synthesis, Sb (3+) will reduce Mo (6+) to a lower oxidation state (5+ or 4+). A catalyst with Mo in this reduced state will have lower activity than a catalyst with Mo in its highest oxidation state (6+). It is believed that the catalytic reaction of oxidation of an unsaturated aldehyde, such as methacrolein, to unsaturated carboxylic acids, such as methacrylic acid, is a redox mechanism in which the methacrolein is oxidized by abstracting an oxygen atom which reduces Mo in the keggin structure of the heteropoly acid compound catalyst. If Mo is not in its highest oxidation state, the activity of the catalyst would be reduced. Minimizing the contact or reaction time for the antimony will lessen the reduction of Mo (6+) by Sb (3+) but will leave a large amount of Sb(+3) remaining in the catalyst. Increased contact or reaction time increases the reduction of Mo(+6) by Sb(+3) but decreases the amount of Sb(+3) remaining in the catalyst. The less Sb(+3) remaining results in a more stable catalyst due to less reduction of Mo(+6) in subsequent process steps. Mo not at its highest oxidation state can be reoxidized to its highest state. Reoxidation can be accomplished by air oxidation, air-liquid and/or air-solid contact, during catalyst synthesis of the solutions/slurries of the component compounds, during removal of the liquid and drying the solid precipitate and during calcination. Air can be introduced to the solution/slurry during catalyst synthesis, e.g., air sparging. An oxidizing agent, such as hydrogen peroxide, nitrous oxide, nitrogen oxide, nitric oxide or mixtures or combinations, can be introduced into the solutions/slurries of the catalyst synthesis. The solid precipitate is dried in an oxygen environment, e.g., air, mixture of oxygen with inert gas, etc. Calcination is in an oxygen environment, e.g., air, mixture of oxygen with inert gas, etc. Enriched oxygen above 21% by volume oxygen or pure oxygen can be used. Ozone or any other oxidizing gas such as nitric oxide or nitrous oxide, containing atomic oxygen can be used.

One embodiment of the invention is to oxidize reduced molybdenum in the slurry during catalyst synthesis. Oxidant compounds, such as hydrogen peroxide, can be added to the slurry.

Another embodiment of the invention is to increase the time between forming a slurry and separating the solid from the liquid of the slurry, i.e., maximize the aging or digestion time. The slurry may be aged or digested for more than 0.5 hours. If the slurry is aged or digested for longer than 3 hours without sufficient oxidation, molybdenum is reduced to an oxidation state less than (+6) and the solid catalyst precursor must be reoxidized so that molybdenum can be at its highest oxidation state. The solid can be reoxidized during drying.

Another embodiment of the invention is to reoxidize the catalyst precursor, i.e., molybdenum, during calcination. The catalyst precursor may be reoxidized by sufficient gas-solid contact and minimizing solid-solid contact between the particles. The gas can be oxygen or an oxygen-containing gas, such as air or oxygen-enriched air.

Another embodiment of the invention is to control the uncalcined particle density such that porosity of the solid will allow sufficient gas-solid contact to reoxidize the catalyst precursor during calcination. Particle density of the uncalcined solid should be no more than 3.0 g/cc. The amount of pressure used to form the solid into a particular shape and size can be adjusted to yield a particle having a particle density of no more than 3.0 g/cc.

After calcination the formed catalyst should be stored in an oxidizing environment such as air or enriched air. The moisture content of the air surrounding the catalyst should be as low as possible e.g. humidity below 5% ambient. The storage temperature should be as low as reasonably possible, but at least below 35° C. The catalyst can be stored at ambient pressure, but increasing the pressure above atmospheric would be beneficial.

The catalyst may be processed by sieving, forming and other means known in the art to obtain catalyst particles of a certain size. Desired particle size and particle size distribution are related to the design of the reactor (size, shape, configuration, etc.), to the pressure drop intended for the process and to the process flow. For a two-stage calcination, the catalyst may be sieved or formed after the first stage calcination and before the second stage calcination. In a commercial process the catalyst precursor may be sieved and formed after spray drying and before calcination.

The catalyst of the present invention may be used as an unsupported catalyst or a supported catalyst. The surface area of an unsupported catalyst is from 0.1 to 150 $m^2/g$ or from 1 to 20 $m^2/g$. If supported, the support should be an inert solid which is chemically unreactive with any of the active components of the catalyst and in one embodiment of the invention is silica, alumina, niobia, titania, zirconia or mixtures thereof. The catalyst may be affixed to the support by methods known in the art, including incipient wetness, slurried reactions and spray drying. The catalyst, supported or unsupported, is not limited by shape, size or particle distribution and may be formed as appropriate for the reaction vessel in the process. Examples are powder, granules, spheres, cylinders, saddles, etc.

The process of using the present invention is to contact the feedstock containing saturated and/or unsaturated aldehydes with an oxygen-containing stream in the presence of the heteropoly acid compound catalyst in a vapor phase reaction at reaction conditions to produce an unsaturated carboxylic acid. In one embodiment of the present invention, the feedstock for this process is an unsaturated aldehyde, such as methacrolein, which may be the product of an oxidation reaction of an olefin, such as isobutylene, and may contain a recycle of the oxidation of the unsaturated aldehyde, such as methacrolein, to unsaturated carboxylic acids, such as methacrylic acid. Therefore, the feedstock contains, in addition to unsaturated aldehydes, unreacted reactants, inerts and byproducts, such as water, oxygen, nitrogen, carbon monoxide, carbon dioxide, noble gases, acetone, acetic acid, acrolein, methacrylic acid, isobutylene, and other olefins and saturated and unsaturated hydrocarbons. The concentration of unsaturated aldehydes in the feedstock may vary over a wide range. Examples of the concentration of methacrolein are from about 1 vol. % to about 20 vol. % or from about 2 vol. % to about 8 vol. %.

In another embodiment of the present invention, the feedstock contains products and byproducts from a process for hydroformylation of an olefin, such as propylene, to saturated aldehydes, such as butanals, e.g., butanal and isobutanal or isobutyraldehyde. In another embodiment of the present invention, the feedstock contains a combination saturated and unsaturated aldehydes in proportions from about 5 wt % to about 95 wt %. Embodiments of the present invention having saturated aldehydes in the feedstock are described in U.S. Patent Application Publication nos. 2007/0106091 A1 and 2007/0021296 A1, which are hereby incorporated by reference.

The oxygen-containing stream may be air or another oxygen-containing gas, such as a mixture of oxygen with inert gas(es), such as nitrogen, carbon dioxide, noble gases and steam. The oxygen-containing stream may be pure oxygen. In one embodiment of the process of the present invention, the amount of oxygen relative to aldehyde would be from 40% less than stoichiometric to 700% more than stoichiometric on a molar basis, preferably 60% more than stoichiometric to 360% more than stoichiometric on a molar basis. In another embodiment of the process of the present invention in which the aldehyde is methacrolein, the amount of oxygen relative to methacrolein is from about 0.3 to about 4, preferably from about 0.8 to about 2.3 by mole ratio.

The process conditions are at a pressure from about 0 atm to about 5 atm, preferably at about 1 atm, and at a temperature from about 230° C. to about 450° C., preferably 250° C. to about 400° C., more preferably about 250° C. to about 350° C.

The reactor for the process of the present invention may be any reactor for a vapor phase reaction, such as a fixed bed reactor, a fluidized bed reactor or a moving bed reactor.

The invention having been generally described, the following examples are given as particular embodiments of the invention and to demonstrate the practice and advantages thereof. It is understood that the examples are given by way of illustration and are not intended to limit the specification or the claims to follow in any manner.

EXAMPLES

The following examples show how the oxidizing conditions during wet synthesis, drying, calcination, forming and storage of the catalyst precursor affects the activity of the final calcined heteropoly acid compound catalyst, i.e., the more the catalyst precursor is oxidized, the higher the final catalyst activity.

Effect of Air Oxidation During Synthesis digestion and Drying on Catalyst Activity Heteropoly acid compound catalysts were synthesized as described below. The synthesis was varied in digestion time, drying time, and forming conditions in order to determine the effects on catalyst performance.

Synthesis of HPA Catalyst 46.5 g of ammonium molybdate and 1.285 g of ammonium metavanadate were dissolved in about 200 mL of deionized water overnight. After 16 hours, 4.276 g of cesium nitrate was dissolved in 25 mL of water and 3.8 g of phosphoric acid was dissolved in 6 mL of water and added to the molybdate/vanadate solution at room temperature. 0.51 g of copper nitrate was added to the solution about three minutes later. 5.32 g of bismuth nitrate was dissolved in dilute nitric acid made from 11.3 g of concentrated nitric acid and 7 mL of concentrated ammonium hydroxide dissolved in 30 mL of water, which was added to the molybdate solution at room temperature. Heat was then applied to the solution to raise the temperature gradually to about 95° C. over about 30-50 minutes after which 2.56 g of solid antimony trioxide and 0.68 g of solid boric acid were added to the solution. After the digestion period of 0.5, 3 or more hours, aliquots of slurry were withdrawn from the reaction tank and the slurry was either dried in a spray dryer at about 120-150° C. or in a static oven at about 125° C. for up to 16 hours. The dried cake was ground to a fine powder, pressed at 10,000 or more psi and sized to −20+30mesh. The sized catalyst precursor was calcined at in a rotary or fixed calciner with an air flow of 500 or more cc/min. The standard calcination profile was to increase the temperature from room temperature to 250° C. at a 0.5° C./min ramp rate, maintain temperature for 0.5 hr; increase temperature to 380° C. with a ramp rate of 0.5° C./min and maintain temperature for 5 hours.

Catalyst Testing

For each of the samples in the Examples, 6.0 cc of the calcined catalyst was loaded in the stainless steel reactor with 9 cc of quartz chips and the reaction was carried out at 15 psia with a vapor stream of the following composition: 4 vol % methacrolein, 8 vol % oxygen and 30 vol % steam with the balance being nitrogen. Relative activities are defined as the ratio of activities of the sample over the activity of the reference catalyst which is defined with an activity of 1.0. The absolute percent difference between the activities of the catalysts of the Examples is "relative activity." If the catalyst showed an activity 30% higher than the standard catalyst, then this catalyst would have a relative activity of 1.3. Relative Selectivity means the difference in percent selectivity between the sample catalyst minus the percent selectivity of the reference catalyst.

A spectrophotometric test was also developed to measures the relative activity of the catalyst. The test procedure involves extracting the water soluble components of the heteropoly acid compound catalyst and measuring the absorption spectrum of the extract at a wavelength of 217 nm. The species that gives the 217 nm absorption band correlates with the fully oxidized Mo (6+) which is colorless. The absorbance values of the samples listed in Table I were plotted against relative activity and gave a strong correlation coefficient of r=0.94. The catalyst relative activity values were determined from reactor testing. This shows that the catalyst activity strongly correlates with the oxidized molybdenum species. The more oxidized the catalyst, the higher the activity.

TABLE I

Relative Activity and UV-Visible absorbance values for various heteropoly acid compound catalyst showing that activity increases with a higher Mo oxidation state.

| Example | Relative Activity | Ultraviolet-Visible Absorbance (217 nm wavelength) |
| --- | --- | --- |
| 1 | 1.49 | 1.8987 |
| 2 | 1.49 | 1.7746 |
| 3 | 1.52 | 1.7234 |
| 4 | 0.88 | 1.675 |
| 5 | 1.27 | 1.5931 |
| 6 | 0.87 | 1.5313 |
| 7 | 0.51 | 1.4331 |
| 8 | 0.66 | 1.3411 |
| 9 | 0.39 | 1.2969 |
| 10 | 0.17 | 1.2065 |
| 11 | 0.17 | 1.177 |

A potentiometric titration test was developed to measure the extent of oxidation or reduction in a heteropoly acid compound catalyst and relate it to relative activity. An extract of the catalyst is titrated with a standardized solution of potassium permanganate. The results of two titrations are listed in Table II which shows the results from an oxidized catalyst Example 12 and a reduced catalyst Example 13. To reach the same endpoint as Example 12, more titrant is required for sample Example 13 which indicates a more reduced Example 13 catalyst. Because sample Example 12 is more oxidized it shows a higher relative catalyst activity at 2.0 compared to 1.2 for the more reduced Example 13 catalyst.

TABLE II

Extent of Reduction in heteropoly acid compound catalysts measured by oxidation titration

| | Oxidized Catalyst Example 12 | | Reduced Catalyst Example 13 | |
| --- | --- | --- | --- | --- |
| | mV | Oxidation Titrant (mL) | mV | Oxidation Titrant (mL) |
| Initial | 588 | 0.0 | 599 | 0.0 |
| Final | 1061 | 5.5 | 1079 | 12.1 |
| Relative Activity | 2.0 | | 1.2 | |
| Description | More oxidized | | More reduced | |

Effect of Digestion and Drying Time on Catalyst Activity

In the synthesis of catalyst samples, after the last reagent, antimony trioxide, was added, the slurry was digested for a period of time and then dried. Example 14 was digested for 12 hours and then tray dried. During the 12 hour digestion time, an aliquot of slurry was collected after 0.5 hour of digestion and then spray dried as Example 15, Table III and another sample was collected after 3.0 hours of digestion and part was spray dried as Example 16, Table III and the remaining slurry was then put into trays for drying which took seven hours as Example 17, Table III.

The color of the dried powder after each of the digestion and drying times are also listed in the table and indicate the extent of the catalyst intermediate reduction. The green color indicates the catalyst intermediate is relatively more oxidized than the grey powder, which in turn is more oxidized than the blue powder. It was discovered that the extent of catalyst oxidation during wet synthesis and drying was reflected in the final catalyst performance after calcination as indicated in the Relative Activity and Relative Selectivity values. Higher values indicate better catalyst performance.

It was discovered that as the digestion period is lengthened then more of the antimony (3+) is reacted. Continuing to digest the catalyst slurry for a longer period (i.e. 12 hours) (Example 14) and react the antimony (3+), effectively consumes the reduced antimony to the point where the oxidized form of antimony (5+) is much higher than the reduced form. Therefore, by the end of the digestion period there is only a small amount, if any, of reduced antimony (3+) available to further reduce the catalyst during subsequent drying, forming, calcination and storage.

The result is that the relative activity and stability of the final catalyst can be maximized because there is little or no antimony (+3) available to reduce the catalyst during the drying, foaming and calcining steps. A longer digestion period must be accompanied by sufficient air oxidation to re-oxidize the catalyst intermediate that is previously reduced by the antimony (3+) back to the oxidized catalyst form.

It was found that tray drying allows the antimony trioxide to continue to react longer because it takes about 7 hours for the water to evaporate during which time the antimony continues to reduce the catalyst and the reduced molybdenum is re-oxidized back to the (6+) state. Although, the air-solid contact may not be as good since the cake is typically at least several millimeters thick which inhibits air contact with the catalyst slurry, a sufficiently long drying period effectively oxidizes the catalyst precursor. Also, during the tray drying more or all of the reduced molybdenum can be oxidized back to the (6+) oxidation state if there is sufficient oxygen present, while the amount of antimony (3+) is lowered completely, or almost completely.

In contrast, a shorter digestion period (i.e. 0.5 hour) (Example 15) does not allow as much of the antimony trioxide to reduce the molybdenum, minimizing reduction of the catalyst by the antimony trioxide and only a small amount of catalyst is reduced. In this case, the small amount of reduced catalyst can be completely or almost completely reoxidized during the drying period giving a finished catalyst with an initially high activity, but which is unstable because the catalyst still has Sb(+3) available for reduction of molybdenum.

Since most of the reduced Sb (3+) is unreacted after the digestion and drying steps, it will continue to react to reduce the molybdenum during forming, calcination, and storage giving a lower stability catalyst.

An intermediate digestion period (i.e. 3.0 hours) (Examples 16 and 17) allows more of the antimony trioxide to react and reduce more the molybdenum in the catalyst than a shorter digestion period, but less than a 12 hours digestion period. If more of the antimony trioxide is allowed to react during a longer digestion period (i.e. 3.0 hours) then the catalyst precursor must be oxidized for longer periods of time or under more stringent conditions to ensure that the higher amount of reduced molybdenum which is produced is then reoxidized. However, as with a shorter digestion period, an intermediate digestion period results in an unstable catalyst due to incompletely reacted antimony (3+).

Examples 16 and 17 show how different drying methods can affect the final catalyst activity given the same digestion period. Spray drying the slurry after digestion has the benefit of allowing for better air-solid contact to oxidize the catalyst precursor giving a higher relative activity. However, the spray drying is still not sufficient to overcome the benefit of a longer digestion period in lowering the amount of Sb(+3) present in the catalyst.

TABLE III

Effect of drying type and various digestion times on activity

| Example | Digestion Period (hr) | Drier Type | Drying Time | Dried Powder Color | Stability | Relative Activity | Relative Selectivity |
|---|---|---|---|---|---|---|---|
| 14 | 12 | Tray | 7 hours | Green | Stable | 2.3 | 0 |
| 15 | 0.5 | Spray | Seconds | Green | Unstable | 1.9 | +1 |
| 16 | 3.0 | Spray | Seconds | Grey | Unstable | 1.6 | −1 |
| 17 | 3.0 | Tray | 7 hours | Blue | Unstable | 1.4 | −2 |

* Stable = Catalyst maintains high activity through forming, calcination and storage
Unstable = Catalyst activity decreases through forming, calcinations and storage Without sufficient digestion time and drying time to allow complete oxidation of antimony and molybdenum, the catalyst would not be stable, i.e., maintain high activity through subsequent processing steps for the catalyst, e.g., forming, calcinations and storage.

The results of the drying methodology on final catalyst activity are shown again in the following Table IV with Examples 18-20. In this case all three samples had the same digestion time of three hours from the same run, with various types of drying and with and without aeration during synthesis.

Example 18 was spray dried, producing a slightly reduced catalyst and lower catalyst activity than Example 14. Example 19 was tray dried. Tray drying involves filling a tray with the catalyst precursor slurry and drying in an oven, typically an oven with circulating air. The tray can be filled to about a 3 cm depth. The slurry is dried until a dry cake is obtained. While the slurry is drying in the oven, it was found that the antimony continued to react and reduce the molybdenum while the catalyst precursor was still moist. In essence, a more reduced catalyst is produced since the antimony trioxide would further react during drying. Therefore, oxidation conditions must be developed that counteracts the reduction of the molybdenum while drying. In order to better define the necessary oxidation conditions the catalyst precursor was dried in a circulating air stream to facilitate oxidation of the catalyst. In contrast, the tray was covered in Example 20 to minimize air flow over the catalyst precursor to demonstrate reduced air flow over the catalyst precursor. This catalyst precursor gave the lowest activity for the final calcined catalyst, since it was more reduced.

into a 50 mm deep bed about 19 mm in diameter for Example 23. There was obviously much more restricted air flow around these particles with tight packing of the 3 mm tablets. This was apparent from stacking of the particles with

TABLE IV

With the same digestion period during wet synthesis of 3.0 hours, the affect of Drying Technique and Aeration During Synthesis is listed

| Examples | Digestion Period (hr) | Drier Type | Drying Time | Dried Powder Color | Relative Activity | Relative Selectivity |
|---|---|---|---|---|---|---|
| 18 | 3.0 | Spray | Seconds | Grey | 1.6 | −1 |
| 19 | 3.0 | Tray With Air flow | 7 hours | Grey-blue | 1.2 | −1 |
| 20 | 3.0 | Tray Without Air flow | 7 hours | Dark Blue | 1.0 | −4 |

Effect of Bed Depth and Air Flow During Calcination on Catalyst Activity

The Examples in the following Table V show how the catalyst activity varies with airflow during calcination. Increasing the catalyst oxidation state, the better the catalyst activity. All samples were from the same un-calcined precursor.

TABLE V

Relative Activity Relationship to Calcination Conditions*.

| Examples | Calcination Type* | Bed Depth (mm) | Relative Activity | Relative Selectivity | Comments |
|---|---|---|---|---|---|
| 21 | screen | 3 | 2.6 | +2 | Catalyst particles not touching |
| 22 | screen | 3 | 1.9 | −2 | Catalyst particles touching each other on sides |
| 23 | | | | | Catalyst particles stacked on top and around each other |
| a) | tube | 50 | 1.4 | +1 | |
| b) | | | 1.4 | 0 | |
| 24 | tube | 50 | 0.2 | −9 | Zero airflow through bed. Catalyst particles stacked on top and around each other |

*Airflow is about 70 cm/min in all calculations except Example 24 which was zero.

All of the samples listed in the Table are 3 mm (⅛") tablets calcined as whole tablets and sized to −20+30 mesh (0.8-0.6 mm) size for testing in the microreactor.

Example 21 was calcined as a small batch (~15 g) in the screen calciner which is 20.3 cm in diameter. The bed depth was shallow at 3 mm or a single tablet layer thick. Essentially, there was no particle to particle contact between the tablets during calcination, so airflow was not restricted around the particles giving good gas-particle contact. This sample gave the highest activity since activity is directly related to the catalyst oxidation state. Catalyst oxidation state is determined by how efficient air oxidation is during calcination.

When the batch size is increased to about 60 g in Example 22 using the screen calciner and same calcination conditions, the activity decreases from about 2.6 to 1.9 apparently due to restricted air flow around the particle. In this case, there is particle to particle contact between the catalyst tablets which would restrict air flow and decrease gas-particle contact and decrease air oxidation of the catalyst. The catalyst bed was 3 mm deep.

In order to test the effect of a deep bed typical of a commercial reactor, the same precursor tablets were charged end-to-end particle contact, and side-to-end particle contact. The result was a decrease in activity to 1.4 which indicates less air oxidation of the catalyst.

The result of Example 23a) was replicated in a second run Example 23b) (Relative activity 1.4, Relative selectivity 0). The catalyst bed was again 50 mm deep with a calcination temperature of 385° C., and 5° C./min ramp, except with a 10 hour soak time. The additional soak time apparently did not change the oxidation state of the catalyst suggesting the air flow is restricted through the catalyst bed.

In order to demonstrate the requirement for air flow, the catalyst was charged into a 50 mm bed with zero airflow in Example 24. The result was less air oxidation with a very low activity of 0.2 compared to 2.6 for good air oxidation.

Effect of Catalyst Particle Forming Pressure and Density on Activity

It was determined that the only way to form the heteropoly acid compound catalyst into a particle shape and size that is commercially suitable is by pressing the precursor powder. However, we discovered that the activity of the catalyst is sensitive to the amount of pressure used to press the powder into the desired form. This effect is observed in Examples 25 and 26, Table VI. When the pressing pressure is increased from 10,000 to 12,000 psi, for example, the catalyst relative activity was found to decrease in this case from 1.9 to 0.9. It is believed that as the heteropoly acid compound powder is compressed with a high pressing pressure, then oxygen is inhibited from re-oxidizing the reduced molybdenum in the catalyst in the process. The more reduced molybdenum in the catalyst the lower the catalyst activity.

TABLE VI

HPA Catalyst Particles Formed in the Laboratory by Powder Pressing

| Examples | Forming Pressure (psi) | Calcination Bed Depth (mm) | Calcination Batch Size (g) | Relative Activity | Relative Selectivity | Comments |
|---|---|---|---|---|---|---|
| 25 | 10,000 | 3 | 20 | 1.9 | −1 | Lower green (un-calcined) catalyst particle density |
| 26 | 12,000 | 3 | 20 | 0.9 | −4 | Higher green (un-calcined) catalyst particle density |

Table VII lists tablets made under varying pressing pressure to give different crush strengths and calcined in various calcination bed sizes (Examples 27-32), including two ring shaped samples (Examples 31 and 32).

When 3 mm (⅛") diameter tablets formed with a green tab density of 2.6 g/cc were calcined in various calcination bed sizes we found that the activity decreased from as high as 2.6 to 1.4 due to restricted air flow and deeper calcination beds (Examples 27-29).

When the tablet batch size is increased to about 60 g (Example 28) versus 15 g (Example 27) using the screen calciner and same calcination conditions, the activity decreases from about 2.6 to 1.9 presumably due to restricted air flow around the particle. In this case, there is particle to particle contact between the catalyst tablets which would restrict air flow and decrease gas-particle contact and decrease air oxidation of the catalyst.

In comparison, the tablet with a green tab density of 3.1 (Example 30) was made with a higher pressing pressure to give a higher crush strength. Based on previous laboratory data we expected the activity to be lower, which it was at 0.9 relative activity.

This relationship was also observed with the rings (Examples 31-32). In order to make the ring structure of ⁷⁄₃₂" diameter and height, and a ²⁄₃₂" wall thickness with a crush strength of about 5 lbs, a higher pressing pressure was required. The higher pressing pressure gave a green particle density of 3.3. With a higher particle density the porosity is lower and the observed activity is lower because the catalyst oxidation is not as good.

The effect of bed size was also observed for the rings with a 25 mm deep bed giving a catalyst activity of 1.0 compared to an activity of 1.6 for a bed depth of about 5 mm. The deeper catalyst bed restricts the airflow around the catalyst particles which is required to re-oxidize the catalyst effectively.

TABLE VII

HPA Catalyst Particles Formed Commercially

| Examples | Commercial Catalyst Form | Green (uncalcined) Particle Density (g/cc) | Calcination Bed Depth (mm) | Relative Activity | Crush Strength (lbs) |
|---|---|---|---|---|---|
| 27 | ⅛" tablets | 2.6 | 3 | 2.6 | 5 |
| 28 | ⅛" tablets | 2.6 | 3 | 1.9 | 5 |
| 29 | ⅛" tablets | 2.6 | 50 | 1.4 | 5 |
| 30 | ⅛" tablets | 3.1 | 3 | 0.9 | 10.5 |
| 31 | ⁷⁄₃₂" rings | 3.3 | 5 | 1.6 | 5 |
| 32 | ⁷⁄₃₂" rings deep bed | 3.3 | 50 | 1.0 | 5 |

All of the samples listed in Table VII are calcined as whole tablets or rings and sized to −20+30 mesh (0.8-0.6 mm) size for testing in the microreactor.

Effect of Lubricant Level During Forming on Activity

The heteropoly acid compound catalyst was unexpectedly found to be sensitive to forming conditions including lubricant level. Depending on lubricant level, particle density and crush strength resulting from forming pressure can vary. The Examples listed in Table VIII indicate that a level of lubricant of at least about 4.4 wt. % in conjunction with a crush strength of at least about 5 lbs. and a green tab density of no more than about 2.75 cc/g will produce a formed catalyst that does not deactivate. It is believed that the lubricant acts to keep the tablet porosity sufficiently high enough to allow re-oxidation of the catalyst in the process. Examples 33-36 were made with various pressing pressures to obtain varying crush strengths. The varying pressing pressures resulted in varying catalyst particle densities which gave different initial relative activities. Examples 33 and 36 which both had a crush strength of at least 5 lbs but a lubricant level during forming below the minimum required amount and a green tab density of more than 2.75 cc/g had low relative activity (Example 33) or showed good initial activity, but the catalyst quickly deactivated (Example 36).

TABLE VIII

Forming conditions for heteropoly acid compound catalysts formed into ⅛" tablets using various pressing pressures and lubricant levels.

| | Green Tab | | Crush | Lubricant | |
|---|---|---|---|---|---|
| Example | Density (cc/g) | Initial Relative Activity | Strength (lbs) | Graphite (wt. %) | H2O (wt. %) |
| 33 | 3.0 | 0.9 | 10.5 | 2 | 4 |
| 34 | 2.7 | 2.2 | 8 | 4.4 | 0 |
| 35 | 2.5 | 2.2 | 5 | 4.4 | 0 |
| 36 | 2.9* | 1.9 | 5 | 2 | 0 |

*Sample quickly deactivated

Effect of Antimony Oxidation State on Catalyst Activity

In order to determine if using oxidized antimony pentoxide would have an effect on activity the Examples in Table IX were synthesized under the same conditions. Example 37 was made using the reduced antimony trioxide (Sb3+) and Example 38 was made using the oxidized antimony pentoxide (Sb5+). Using oxidized antimony prevents reduction of the molybdenum during synthesis leading to a higher catalyst activity. Although a higher relative activity is attained by using the fully oxidized antimony pentoxide the relative selectivity was not as high as when the starting reagent is antimony (3+) trioxide. In other words, antimony (3+) trioxide must be used to attain the highest selectivity. Since antimony (3+) trioxide reduces the molybdenum in the catalyst then the catalyst must be re-oxidized as previously described to be active.

TABLE IX

Effect of Antimony Oxidation State on catalyst activity under the same conditions

| Example | Antimony Oxide | Relative Activity | Relative Selectivity |
|---|---|---|---|
| 37 | $Sb_2O_3$(Sb3+) | 1.4 | 0 |
| 38 | $Sb_2O_5$(Sb5+) | 2.4 | −4 |

Effect of Atmospheric Moisture Exposure During Storage

In terms of exposure to atmospheric moisture, there are two additional unit operations that occur after the calcination unit operation for a total of seven unit operations for HPA manufacture. The unit operations are packaging/storage and reactor loading following calcination.

HPA catalysts can reduce after calcination in the presence of atmospheric moisture about room temperature and above. It is believed, without being limited by theory, reduction after calcination in the presence of water is due to the reaction of unreacted antimony trioxide to reduce molybdenum oxide from the (+6) to (+5, +4) oxidation states. Consuming the Sb (3+) and oxidizing it to (Sb5+) during the digestion, drying, forming and calcination steps prevents the reduction from happening during storage. Reducing the molybdenum oxide decreases the activity of the catalyst. Although the water may not be directly involved in the reaction, it apparently facilitates the redox reaction between the antimony (3+) and molybdenum (6+) species.

Tests were conducted under conditions controlled to a moisture content of the air surrounding the catalyst below 5% ambient, a storage temperature below 35° C. and pressure of atmospheric or above for the packaging and reactor loading of the catalyst. The catalyst was immediately put into a dry air glove bad and sized. The samples were kept in the dry glove bag and when the reactor was ready the sample was immediately loaded. Samples exposed to moisture caused the catalysts to turn blue. The color is indicative of a reduced catalyst with relatively lower activity.

Alternate Oxidants

Hydrogen peroxide was introduced into a heteropoly acid compound slurry which contained reduced molybdenum (Mo4+, 5+) recognized by its blue color. Hydrogen peroxide was found to oxidize the molybdenum from a reduced blue color (Mo4+, 5+) to colorless (Mo6+). Oxidizing the molybdenum will produce a more active catalyst.

Obviously, numerous modifications and variations of the present invention are possible in light of the above teachings. It is therefore to be understood that within the scope of the appended claims, the invention may be practiced otherwise than as specifically described herein.

What is claimed is:

1. A process for preparing a heteropoly acid compound catalyst comprising:
   a) adding a molybdenum compound, vanadium compound, phosphorus compound, bismuth compound, copper compound, boron compound, and cesium compound to water and/or acid, and adding an antimony compound to form a composition comprising molybdenum;
   wherein the molybdenum is at its highest oxidation state, and antimony has a 3+ oxidation state in the composition;
   b) precipitating a catalyst precursor solid from the composition to form a slurry, and introducing an oxidizing agent into the slurry;
   c) separating the solid from liquid of the slurry;
   d) drying the solid;
   e) forming the solid;
   f) calcining the solid to form a heteropoly acid compound catalyst; and
   g) between steps a) and f), subjecting the molybdenum to oxidative conditions.

2. The process of claim 1 further comprising in step a) dissolving a compound of M, wherein M is selected from the group consisting of: lithium, sodium, potassium, magnesium, calcium, strontium, barium, rubidium, zirconium, titanium, chromium, manganese, cobalt, nickel, zinc, cadmium, aluminum, gallium, indium, thallium, silicon, germanium, tin, lead, sulfur, selenium, tellurium, and combinations thereof.

3. The process of claim 2 wherein the compound of M comprises cobalt, nickel, magnesium, zinc, potassium, rubidium, thallium, manganese, barium, chromium, sulfur, silicon, aluminum, titanium, tellurium, tin, zirconium, lead, cadmium, gallium, indium or germanium nitrates, oxides, hydroxides or acids, calcium, strontium, lithium or sodium nitrates or carbonates, or selenium oxides.

4. The process of claim 1 wherein
   the molybdenum compound is ammonium molybdate, ammonium paramolybdate, molybdenum trioxide, molybdenum chloride or mixtures or combinations thereof;
   the phosphorous compound is phosphoric acid, ammonium phosphate or mixtures or combinations thereof;
   the copper compound is copper nitrate, copper chloride or mixtures or combinations thereof;
   the bismuth compound is bismuth nitrate, bismuth oxide, bismuth chloride or mixtures or combinations thereof;
   the vanadium compound is ammonium vanadate, ammonium metavanadate, vanadium pentoxide, vanadium chloride or mixtures or combinations thereof;
   the boron compound is boric acid, boric hydroxide and boron oxide or mixtures or combinations thereof;
   the antimony compound is antimony trioxide; and
   the cesium compound is cesium nitrate, cesium oxide, cesium hydroxides or a salt of cesium.

5. The process of claim 1 wherein
   the molybdenum compound is ammonium paramolybdate or ammonium molybdate,
   the vanadium compound is ammonium metavanadate or ammonium vanadate,
   the phosphorus compound is phosphoric acid,
   the bismuth compound is selected from the group consisting of nitrates, oxides, hydroxides, acids, and combinations thereof, the copper compound is selected from the group consisting of nitrates, oxides, hydroxides, acids, and combinations thereof, the boron compound is selected from the group consisting of nitrates, oxides, hydroxides, acids, and combinations thereof, the cesium compound is selected from the group consisting of nitrates, oxides, hydroxides, acids, and combinations thereof, and the antimony compound is antimony trioxide.

6. The process of claim 1 wherein the molybdenum is reoxidized by air oxidation by air-liquid and/or air-solid contact in one or more of the following: in the slurry, during the separating of the solid from the liquid of the slurry and during drying the solid.

7. The process of claim 1 wherein the oxidizing agent is hydrogen peroxide, nitrous oxide, nitrogen oxide, nitric oxide or mixtures or combinations thereof.

8. The process of claim 1 further comprising aging the slurry for more than 3 hours and reoxidizing the solid during drying.

9. The process of claim 1 wherein the solid is dried in an oven in air at a temperature of 100-150° C. for 2-5 hours.

10. The process of claim 1 wherein the solid has a lubricant level of at least about 4.4 wt. %.

11. The process of claim 10 wherein the lubricant is graphite, water or mixtures thereof.

12. The process of claim 10 wherein the solid is formed with a pressure which results in a crush strength of at least about 5 lbs.

13. The process of claim 10 wherein the solid has a green tab density of no more than about 2.75 cc/g.

14. The process of claim 1 comprising forming the solid at a pressure of 10,000 psi or less.

15. The process of claim 1 wherein the solid is calcined at a temperature of 200-400° C. for 1-12 hours with sufficient air-solid contact to reoxidize molybdenum.

16. The process of claim 1 wherein the solid is calcined in two stages with a first stage at a temperature of 150-300° C. for 1-5 hours before forming and a second stage at a temperature of 300-400° C. for 4-8 hours after forming.

17. The process of claim 15 wherein the calcination is in enriched air.

18. The process of claim 1 further comprising storing the heteropoly acid compound catalyst in air or enriched air with a moisture content below 5% ambient at a temperature below 35° C. and a pressure above atmospheric.

19. The process of claim 1, further comprising calcining the solid before the step of forming the solid.

20. The process of claim 1, further comprising:
subjecting the molybdenum to oxidative conditions by introducing, oxygen into the slurry.

21. A process for preparing a heteropoly acid compound catalyst comprising:
a) adding a molybdenum compound, vanadium compound, phosphorus compound, bismuth compound, copper compound, boron compound, and cesium compound to water and/or acid, and adding an antimony compound to form a composition comprising molybdenum;
wherein the molybdenum is at its highest oxidation state, and antimony has a 3+ oxidation state in the composition;
b) precipitating a catalyst precursor solid from the composition to form a slurry;
c) aging the slurry for more than 3 hours;
d) separating the solid from liquid of the slurry;
e) drying the solid, wherein during the drying the solid is reoxidized;
f) forming the solid;
g) calcining the solid to form a heteropoly acid compound catalyst; and
h) between steps a) and g), subjecting the molybdenum to oxidative conditions.

22. The process of claim 21, wherein the solid has a lubricant level of at least about 4.4 wt %.

23. The process of claim 21, wherein the calcining the solid in two stages with a first stage at a temperature of 150 to 300° C. for 1 to 5 hours before forming and a second stage at a temperature of 300 to 400° C. for 4 to 8 hours after forming.

24. The process of claim 21, wherein the calcining is in enriched air.

25. The process of claim 21, further comprising storing the heteropoly acid compound catalyst in air or enriched air with a moisture content below 5% ambient at a temperature below 35° C. and a pressure above atmospheric.

26. A process for preparing a heteropoly acid compound catalyst comprising:
a) adding a molybdenum compound, vanadium compound, phosphorus compound, bismuth compound, copper compound, boron compound, and cesium compound to water and/or acid, and adding an antimony compound to form a composition comprising molybdenum;
wherein the molybdenum is at its highest oxidation state, and antimony has a 3+ oxidation state in the composition;
b) precipitating a catalyst precursor solid from the composition to form a slurry;
c) introducing an oxidizing agent into the slurry;
d) aging the slurry for more than 3 hours;
e) separating the solid from liquid of the slurry;
f) drying the solid, wherein during the drying the solid is reoxidized;
g) forming the solid;
h) calcining the solid to form a heteropoly acid compound catalyst; and
i) between steps a) and h), subjecting the molybdenum to oxidative conditions.

27. The process of claim 26, wherein the solid has a lubricant level of at least about 4.4 wt %.

28. The process of claim 26, wherein calcining the solid is in two stages with a first stage at a temperature of 150 to 300° C. for 1 to 5 hours before forming and a second stage at a temperature of 300 to 400° C. for 4 to 8 hours after forming.

29. The process of claim 26, wherein the calcining is in enriched air.

30. The process of claim 26, further comprising storing the heteropoly acid compound catalyst in air or enriched air with a moisture content below 5% ambient at a temperature below 35° C. and a pressure above atmospheric.

31. The process of claim 26, wherein:
the solid has a lubricant level of at least about 4.4 wt %;
wherein calcining the solid is in two stages with a first stage at a temperature of 150-300° C. for 1-5 hours before forming and a second stage at a temperature of 300-400° C. for 4-8 hours after forming;
wherein the calcining is in enriched air; and
further comprising storing the heteropoly acid compound catalyst in air or enriched air with a moisture content below 5% ambient at a temperature below 35° C. and a pressure above atmospheric.

32. The process of claim 26, further comprising at least one of:

wherein the solid has a lubricant level of at least about 4.4 wt %;

wherein calcining the solid is in two stages with a first stage at a temperature of 150-300° C. for 1-5 hours before forming and a second stage at a temperature of 300-400° C. for 4-8 hours after forming;

wherein the calcining is in enriched air; and further comprising storing the heteropoly acid compound catalyst in air or enriched air with a moisture content below 5% ambient at a temperature below 35° C. and a pressure above atmospheric.

* * * * *